United States Patent [19]
Shultz et al.

[11] Patent Number: 5,504,406
[45] Date of Patent: Apr. 2, 1996

[54] WIPER SYSTEM WITH VARIABLE HOLDDOWN FORCE

[75] Inventors: Michael D. Shultz; Christopher J. Shultz; Gil F. Schultz, all of Novi, Mich.

[73] Assignee: SGS-Thomson Microelectronics, Inc., Carrollton, Tex.

[21] Appl. No.: 176,532

[22] Filed: Jan. 3, 1994

[51] Int. Cl.$^6$ ........................................................ B60S 1/28
[52] U.S. Cl. ................. 318/443; 15/250.27; 15/250.203; 318/DIG. 2
[58] Field of Search ....................... 318/443, 444, 318/DIG. 2; 15/250.01, 250.02, 250.2, 250.27, 250.36; 388/907.5

[56] References Cited

U.S. PATENT DOCUMENTS

| | | | |
|---|---|---|---|
| 4,370,774 | 2/1983 | Bienert et al. | 15/250.2 |
| 4,439,886 | 4/1984 | Yagasaki et al. | 15/250.2 |
| 4,698,872 | 10/1987 | Watanabe | 15/250.2 |
| 4,736,484 | 4/1988 | Bauer et al. | 15/250.2 |
| 4,785,491 | 11/1988 | Yamamoto et al. | 15/250.2 |
| 4,866,357 | 9/1989 | Miller et al. | 318/443 |
| 4,881,019 | 11/1989 | Shiraishi et al. | 318/68 |
| 5,095,255 | 3/1992 | Honda et al. | 318/264 |
| 5,161,280 | 11/1992 | Sumiya et al. | 15/250.2 |
| 5,355,061 | 10/1994 | Forhan | 318/443 |
| 5,390,391 | 2/1995 | Zimmer et al. | 15/250.2 |

*Primary Examiner*—Bentsu Ro
*Attorney, Agent, or Firm*—Robert Groover; Lisa K. Jorgenson; Richard K. Robinson

[57] ABSTRACT

A windshield wiper system in which a dedicated microcontroller controls not only the wiper motor, but also a solenoid which provides dynamically variable downforce on the wiper blade.

20 Claims, 4 Drawing Sheets

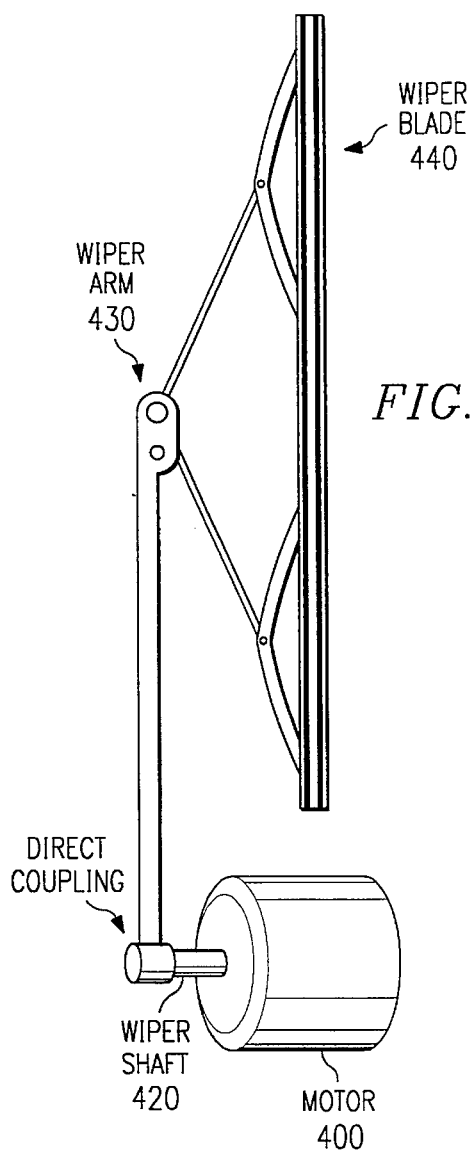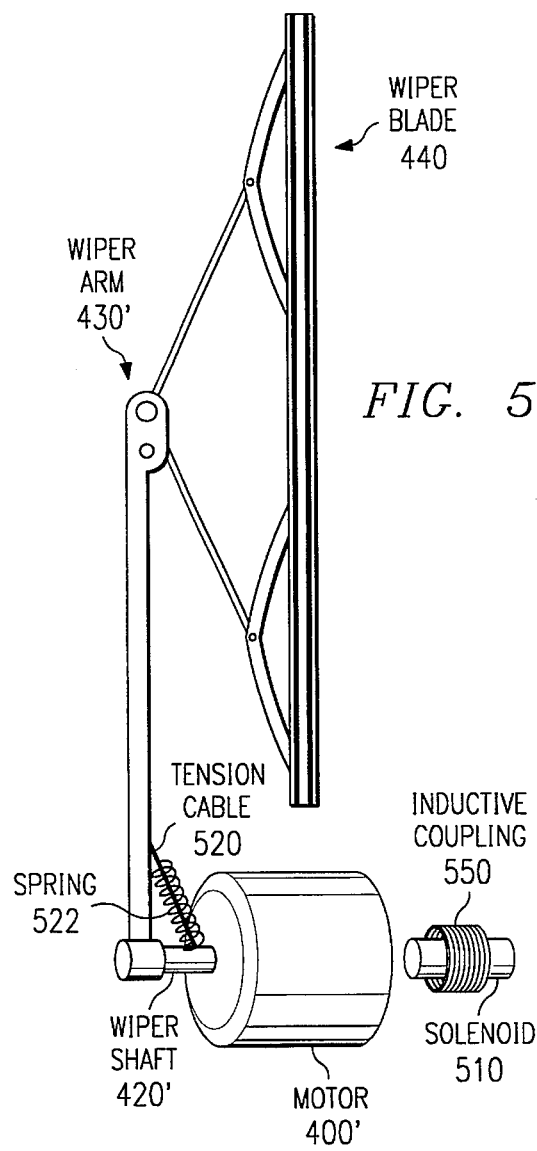
FIG. 4
FIG. 5

WIPER SYSTEM WITH VARIABLE HOLDDOWN FORCE

BACKGROUND AND SUMMARY OF THE INVENTION

The present invention relates to structures and control systems for operation of small motors, and particularly structures and control systems for operation of vehicular windshield wipers.

Windshield Wiper System without Reversing Linkage

The present disclosure describes a wiper system for the transportation industry that does not have cams, eccentrics or other complicated mechanical means to reverse the direction of the wipers.

This is based on a low cost variable reluctance or similar type brushless motor technology. (A "variable reluctance motor" is a motor with rotor lobes of ferromagnetic material, usually soft iron). By selectively exciting a stator field in the correct position, a rotor lobe can be pulled toward regions of increasing magnetic field intensity. Motion of a conductive rotor through the stator field will of course induce secondary current in the rotor, so that this type of DC motor has very significant similarities to an (AC) induction motor. This polyphase motor will typically be operated as though not limited to three phases. For low driver cost, the stator would be wound such that three single ended drivers would be used. The rotor can be a normal rotor, but a modified one (according to other innovative teachings would be much better).

Dedicated Microprocessor Control of Wiper Operation

According to certain innovative teachings disclosed herein, a microprocessor is used to directly control operation of the wiper motors which does not include any reversing linkage.

By direct control of switching transistors to drive a reversible brushless motor, the microprocessor has full control of wiper motor operation: torque is controlled by current (i.e. by the duty cycle of the power transistors), speed of the motor by frequency, and position by rotor-field relationships.

This can be implemented with a microcontroller, a few MOSFETs, and a few resistors. Of course, other microcontrollers or microprocessors can also be used, or a fully integrated solution can also be used.

Control of Multiple Wiper Motors

Note that the programmable control capability provided by the present invention can also be used to control multiple wiper motors with a single dedicated microcontroller. This eliminates linkage losses, and also (in some embodiments) provides an added safety feature: the wipers and motors can be positioned to operate redundantly, so that the other wipers will continue operating if one first wiper motor fails.

A further advantage of the disclosed innovations is that more than two wipers can easily be designed in. Traditionally, three-wiper systems have been fairly uncommon in passenger cars, but design of such systems is now greatly simplified by the disclosed innovations. Blade positions can easily be coordinated, and multiple blade synchronization patterns can automatically selected depending on road conditions.

Shared Dedicated Controller for Wiper Motor and Washer Pump

The controller is also capable of driving another brushless or brush type motor for the washer solution. By directly driving the phases of the washer solution motor, a lower cost brushless motor can be used. This will eliminate all the problems of brushes, such as wear-out, arcing, etc. Variable volumetric delivery is easily implemented without any additional hardware.

Using this smart control architecture, many additional optimization algorithms can be added. For example, the wiper speed and the delivery of washing fluid can be made directly dependent on the vehicle speed.

Communication capabilities can easily be implemented, and (though not limited to such) can be implemented with any of the normal automotive bus configurations, such as PWM, VPWM, JT 1850, SCP, DLC, or PCMI.

Variable Downforce

In a further class of embodiments, a solenoid or other means is used to help the wiper blades maintain contact with the windscreen. Communications with other modules in the vehicle would allow proper force to be exerted by the blades, compensating for speeds. This can be controlled by analog or digital means, such as PWM.

FIG. 5 shows the linkage used, in the presently preferred embodiment, to provide variable downforce on the wiper blades.

An advantage of this—as opposed to using maximum downforce all the time—is a reduction in the chances of scratching the windshield with abrasive bits of road dirt. A further advantage is the ability to use a maximum downforce which could stall or burn out the wiper motor if applied under conditions where there was no lift on the wiper blades. A further advantage is the ability to adapt wiper operation for winter conditions when ice or snow must be cleared from a windshield.

DC Motor with Increased Rotor Resistance

The present application discloses a modified low-speed DC motor which particularly adapted for frequent reversal. The modification is the opposite of what most motor manufacturers seek to do: the resistance of the rotor is intentionally increased. This can be implemented by changing the material and/or size of the bars. It can also be accomplished by increasing the resistance of the bar-shorting mechanism typically connecting the bars at the ends of the rotor. This would be easy to implement by decreasing the size and/or changing the material used to short the bars.

This will cause the motor to lose its high speed characteristics and become more lossy and would result in a higher operating temperature. These effects would be more than compensated by the gains acquired at the low RPM portion of the spectrum, particularly with the constant reversal of motor rotation as required in this type of application.

By using both the battery voltage sense and current sensing, a complete profile can be generated. Conditions such as stalled motor, overloads, etc., can be detected and compensated using well-known algorithms. This gives the controller the capability to drive the motor at maximum speed for a period of time without burning it up. If the load increases or decreases, the drive can compensate for this as well as varying battery voltages.

Infinitely adjustable increment wiper action is implementable at no additional hardware cost and a minimal impact on the software. The sensing for the settings can be digital or analog.

It should be noted that a variable-reluctance motor has zero holding torque, so a magnet (or possibly a clutch) is preferably used to hold the wiper in its "off" position when the motor is not active.

An advantage of this design is that no other modifications have to be made to the motor besides the increased rotor resistance. Thus, minimal incremental change is needed to established motor designs and manufacturing flows.

General background on electric motors is found in Anderson et al., ELECTRIC MOTORS (5.ed. 1991); F. Spreadbury, FRACTIONAL H.-P. ELECTRIC MOTORS: THEIR PRINCIPLES, CHARACTERISTICS AND DESIGN (1951); both of which are hereby incorporated by reference.

BRIEF DESCRIPTION OF THE DRAWING

The present invention will be described with reference to the accompanying drawings, which show important sample embodiments of the invention and which are incorporated in the specification hereof by reference, wherein:

FIG. 4 shows the simple mechanical power train permitted by a sample embodiment of the linkage-less wiper motor train.

FIG. 5 shows the electromechanical linkage used to provide variable holddown force to the wiper blades.

DESCRIPTION OF THE PREFERRED EMBODIMENTS

Figure 1A:
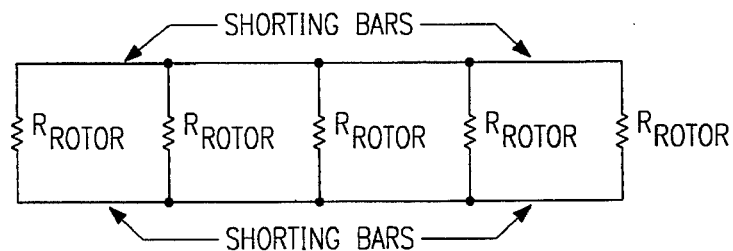
FIG. 1A shows the shorting bar arrangement of a comparable conventional motor, and FIG. 1B schematically shows the modified shorting bars, according to one class of innovative embodiments, which provide a polyphase motor with improved capability for rapid reversals, at the cost of reduced efficiency and high-speed performance.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Mechanical Configuration

FIG. 4 shows the simple mechanical power train permitted by a sample embodiment of the linkage-less wiper motor train. A brushless motor 400 directly drives a wiper shaft 420 (which preferably is simply an extension of the motor shaft). A conventional wiper arm 430 and wiper blade 440 are mounted to the shaft 420 by a conventional direct coupling.

FIG. 5 shows the electromechanical linkage used to provide variable holddown force to the wiper blades. A solenoid 510 (driven by another power transistor, not shown, controlled by the microcontroller 100) has a shaft which is coaxial with the shaft 420' of motor 400', and which is connected to a tension cable 520 which passes through the axis of the wiper shaft 420'. The wiper arm 430' is directly driven (in rotation) by the wiper shaft 420', but also has some freedom of motion to pivot toward or away from the windshield. The tension cable 520 combines with fixed mechanical biasing elements (schematically represented by a spring 522) to exert downforce on the wiper blade 440.

The solenoid 510 can have fixed coils aligned to its rotating shaft, or the whole solenoid can be mounted to the wiper shaft 420' to rotate with it. This could be accomplished with flexible wiring to the solenoid, or more preferably (in the presently preferred embodiment) an inductive coupling coil 550. (Current in the fixed coupling coil 550, which is coaxial with the solenoid 510, will induce secondary current in the winding of solenoid 510.)

Of course, other mechanical arrangements can be used to provide the variable downforce; the arrangement shown is merely a simple example of the numerous configurations which can be used. (For example, a motor could be used instead to provide a variable preload to a spring.)

The variable downforce connection can be used to only to increase downforce for difficult conditions, but also to decrease downforce to facilitate wiper starting in winter conditions.

A further mode of operation, which may be advantageous in winter conditions, is to start with wiper motion within a small arc at the warmest spot in the windshield, and then expand the arc of motion gradually as the mechanical resistance (measured by motor current draw) indicates that the cleared area is expanding.

Electrical Configuration

Figure 2:
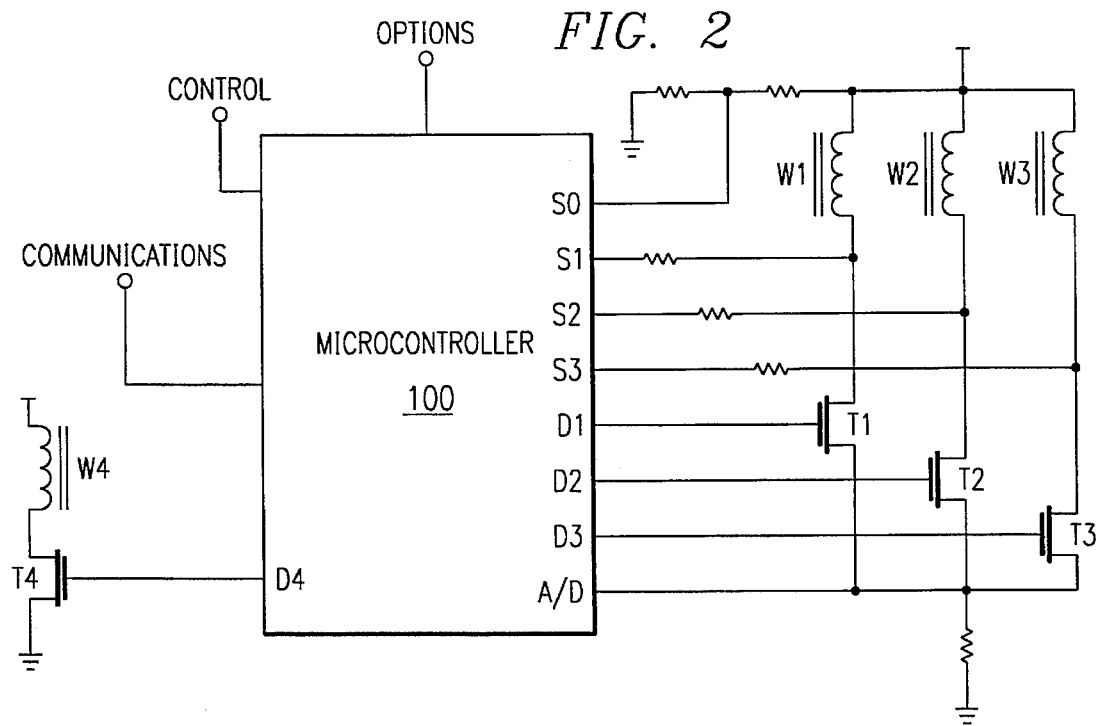
FIG. 2 shows a system block diagram of the presently preferred embodiment.

FIG. 2 shows a system block diagram of the presently preferred embodiment. Microcontroller 100 may be, for example, an ST9030 microcontroller from SGS-Thomson Microelectronics Inc. (Of course, other microcontrollers or microprocessors can also be used, or a fully integrated smart-power solution can also be used.)

Microcontroller 100 includes at least three digital outputs D1–D3, each of which drives the gate of one of the three power MOS transistors T1–T3, each of which pulls current through one of the three motor windings W1–W3. Three voltage-sensing inputs S1–S3, in combination with an input S0 to sense the divided-down supply voltage, provide analog sensing of the voltage across each of the windings W1–W3 and across each of the transistors T1–T3. Analog input port A/D provides current sensing, so that abnormal motor operating conditions can be easily sensed.

When a stuck condition is sensed, the motor rotation can be reversed, or intermittent current can applied in an attempt to shake the wiper blade free; or the current can simply be cut, and an error message supplied.

The microcontroller 100 also includes an appropriate bus interface (indicated as "Control" and "Communications"), and preferably also pins (indicated as "Options") which may be connected to define user-selected or manufacturer-selected options.

In addition, at least one additional output D4 is preferably reserved for control of a power transistor T4 for windshield washer control. Transistor T4 controls a solenoid pump (shown as winding W4) to drive the washer pump. (Alternatively, a brushless motor could be used for the washer pump, and in fact this might be more economical.)

In addition, in embodiments where a single microcontroller 100 controls more than one wiper motor, additional output pins must be provided for control of additional power transistors to drive one or more additional motors. (However, many microcontrollers provide dozens of latched outputs which can be used to control logic-level-input power transistors.) Logic-level-input power transistors have the great advantage that they can be driven directly by CMOS logic levels, without intermediate buffer stages.

Transistors T1–T4 are preferably logic-level-input power transistors, such as an MTP50N06EL. (This specific transistor is a 50A transistor, so it is somewhat overrated for this application. For economy, smaller power transistors would typically be used.)

Figure 6:
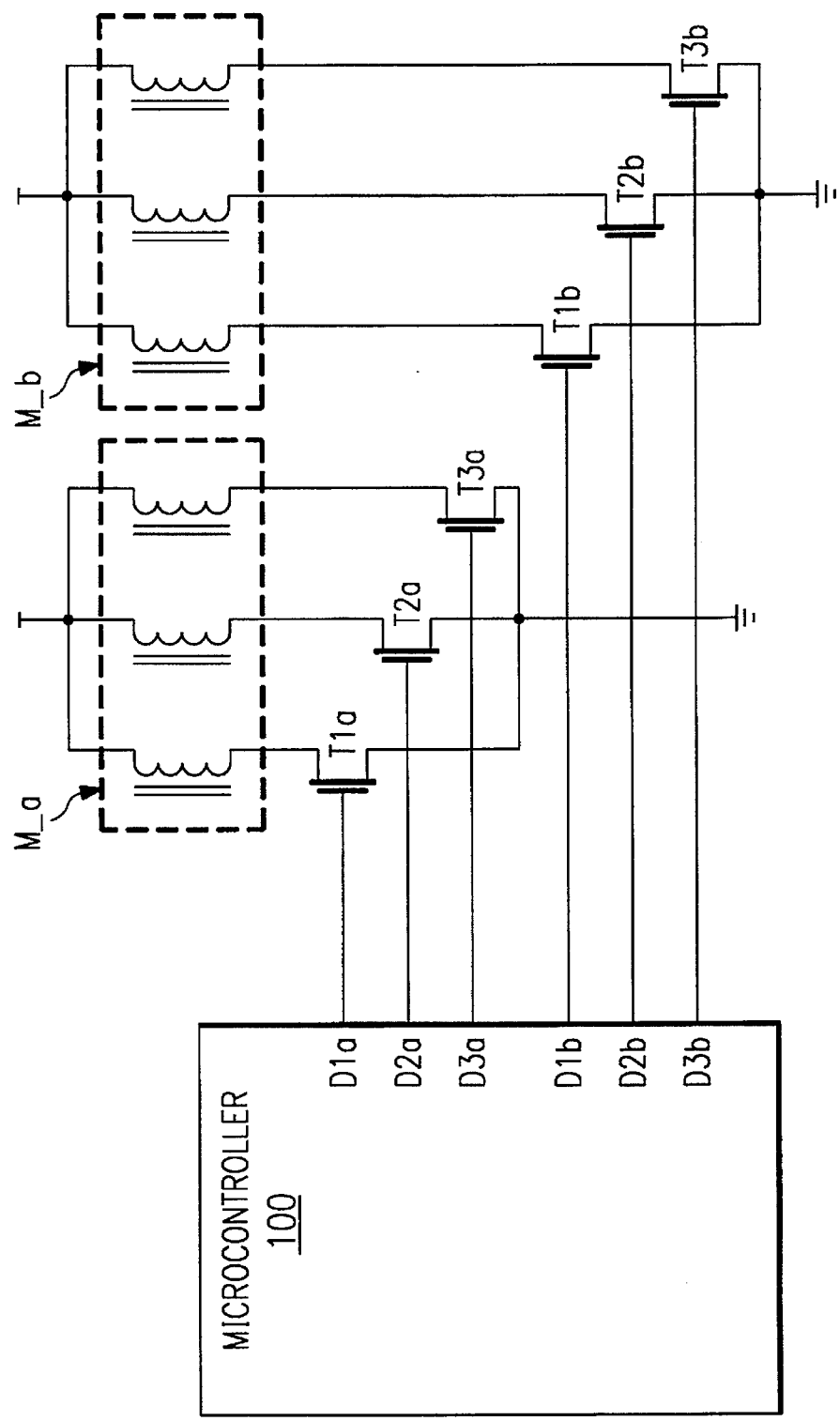
FIG. 6 shows a system block diagram of a system embodiment where a single microcontroller directly controls multiple wiper motors.

FIG. 6 shows a system block diagram of an alternative system embodiment, wherein a single microcontroller directly controls multiple wiper motors M_a and M-b. In this embodiment each of the motors is driven by its own set of driver transistors T1a/T2a/T3a or T1b/T2b/T3b. However, in alternative embodiments it is also possible to simply parallel the motor connections to a shared set of power transistors. This is not preferred, since it does not provide the same degree of protection against a single stuck wiper or failure of a single motor, but is an optional alternative.

Motor Structure

Figure 3A:
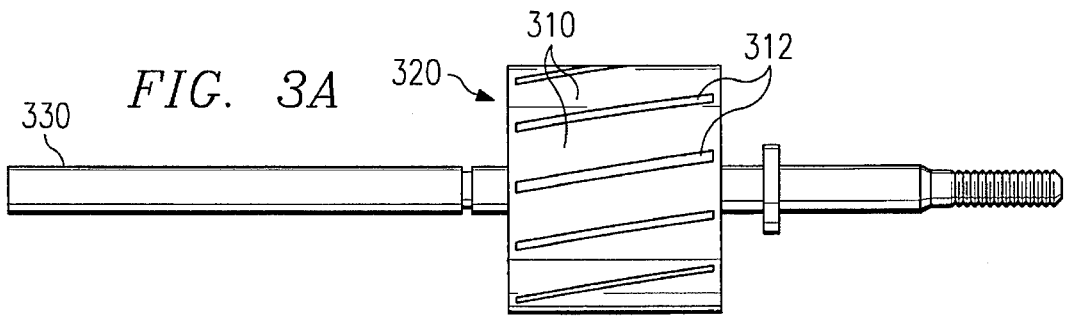
FIGS. 3A and 3B show plan and isometric views of a conventional motor rotor.
Figure 3B:
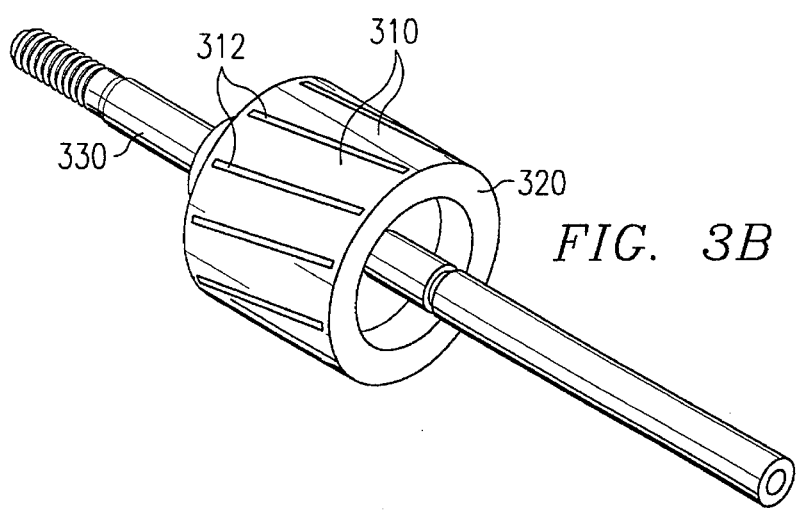

FIGS. 3A and 3B show plan and isometric views of a conventional motor rotor. In this structure a number of rotor bars 310 are connected at the ends by a low-resistance metal endcap/shorting bar structure 320. The metal endcap/shorting bar structure 320 is affixed to rotor shaft 330, which rotates in bearings (not shown) to transmit torque externally. Note that, in this embodiment, the rotor bars are laterally connected by thinner metal portions 312. These thinner portions 312 not only provide additional mechanical support to withstand the large forces on the rotor bars 310, but also contribute to the conductance of the shorting loop. (In some designs this material is made of nonferromagnetic material, such as aluminum, or of nonconductive material.)

Figure 3C:
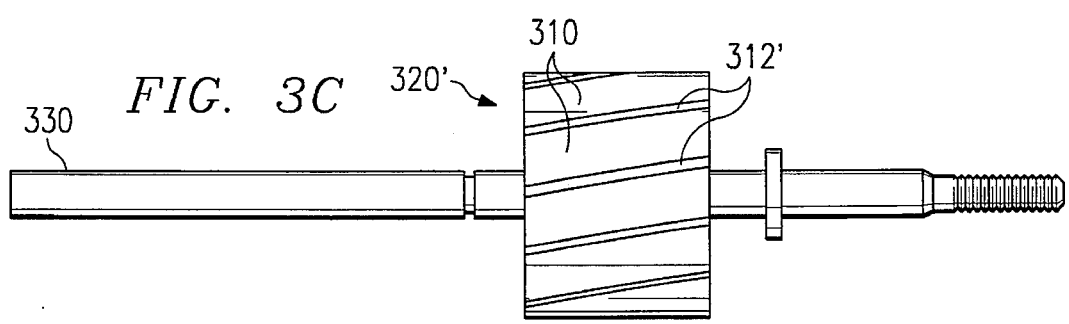
FIGS. 3C and 3D show corresponding plan and isometric views of an innovative motor rotor modified according to the innovations disclosed herein.
Figure 3D:
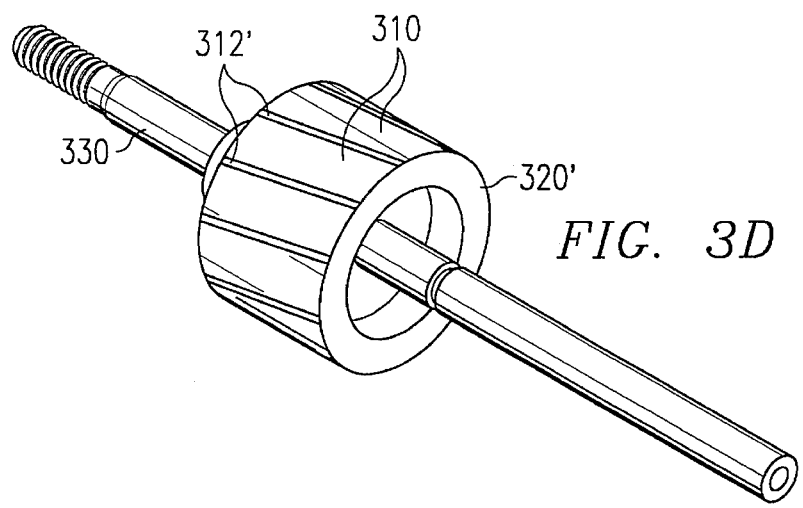

FIGS. 3C and 3D show plan and isometric views of an innovative motor rotor modified according to the innovations disclosed herein. The rotor bars 310 are essentially the same as those in FIGS. 3A and 3B, but the endcap/shorting bar structure 320' is much thinner than endcap 320 of the conventional structure. (In addition, the thinner web material 312' used to laterally connect adjacent rotor bars 310 can be thinned or removed also, to increase the effective shorting bar resistance seen by the induced current loop; but this has not been done in the presently preferred embodiment.) (In the sample embodiment shown, the conventional endcap/shorting bar structure 320 has simply been turned down to produce the thinner structure 320'.)

The prototype was demonstrated with a ⅛ hp squirrel-cage capacitor-run induction motor with straight bars. However, the twist shown can be used with the polyphase motors which are contemplated as most advantageous.

FIG. 1A shows the equivalent circuit of the rotor of a conventional variable-reluctance motor. (Note that the structure and principles of operation are quite similar to those of an induction motor, except that the field phases are directly switched instead of being connected to the phases of an AC line.) Each of the rotor bars 310 has an intrinsic resistance, indicated here as $R_{Rotor}$. (This resistance will typically have a magnitude of less than an ohm, but this magnitude of resistance may still be very significant in view of the large induced currents which typically circulate in the rotor.) The endcap/shorting bar structure is a relatively heavy metal structure, and has a resistance (as seen by the induced current loop) which is significantly smaller than that of the rotor bars. Thus, in this circuit diagram no resistance is indicated in the shorting bars. The induced current loop will flow through both endcaps, so that reducing the resistance of these endcaps reduces heat dissipation. The magnitude of the induced current will depend on the motor's speed, horsepower, and rotor and winding dimensions, but will be much greater than the maximum drive current to the motor, typically by a factor of the order of 10×, 30× or more.

Figure 1B:
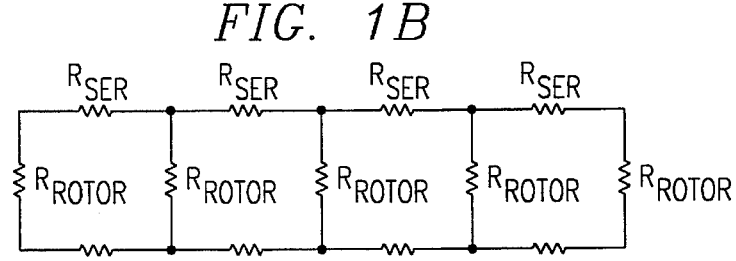

FIG. 1B schematically shows how the resistance of the shorting bar structure is increased, as compared to the conventional structure of FIG. 1A. The shorting bars now have a significant resistance $R_{ser}$, as opposed to the minimal resistance of FIG. 1A. However, it is difficult to specify numerical values for these resistances, since they are distributed resistances which must be integrated over a three-dimensional distribution which is specific to a given rotor shape. Moreover, the exact three-dimensional distribution is dependent on the magnitude of the induced current, which is dependent on the specific operating conditions, including load. With this thickness reduction, the equivalent resistance seen by the induced current is substantially increased over that of the motor of the prior art. More importantly, the equivalent resistance $R_{ser}$ of the shorting bar structure, as seen by the induced current loop, is now greater than the equivalent resistance $R_{rotor}$ of the rotor bar structure, as seen by the seen by the same induced current loop.

FIG. 1B schematically shows the equivalent circuit of the modified motor with modified shorting bars, according to one class of innovative embodiments, which provide a polyphase motor with improved capability for rapid reversals, at the cost of reduced efficiency and high-speed performance.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

It should be particularly noted that the present application includes many separate innovations, and it is not necessary to use all of them together. For example, the disclosed innovative control architecture can be used in combination with a geared or flex-shaft drive instead of a direct drive.

In a further alternative embodiment, the innovative motor rotor structure can be combined with a ferromagnetic element. The induced currents in the rotor provide good running torque, and the ferromagnetic element gives some holding torque when the motor is off.

One contemplated class of alternative embodiments uses a pancake motor. Pancake motors have the advantage of high torque-to-volume ratios. Pancake motors are typically operated in 3 phase delta configuration, but can alternative be operated in a Y configuration, according to the presently preferred embodiment.

For another example, the electrical configuration uses single-ended motor drive. However, a double-ended driver configuration would give better performance, at higher cost.

For another example, the disclosed innovations can be readily adapted to other motor sizes, in accordance with the cost and torque requirements of any particular application.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A windshield wiper system, comprising:

a wiper pivot shaft, a wiper arm affixed to said pivot shaft to be rotated thereby, a wiper blade affixed to said wiper arm to be rotated substantially in the plane of a vehicle windshield, and a variable-reluctance motor connected to rotate said wiper pivot shaft;

a microprocessor electrically connected to receive commands and data from a master microprocessor over at least one system bus, and being electrically connected to sense the voltage across at least one winding of said motor, and having a plurality of output lines;

a plurality of transistors each connected to be controlled by a respective output line of said microprocessor, and each connected to drive a respective one of said motor windings;

an additional mechanical actuator which is mechanically positioned to apply force to an element which moves in response thereto in a direction which is at least partly parallel to said pivot shaft:

a mechanical connection from said element to said wiper arm said mechanical connection being physically separate from the location of said pivot shaft; and spring-loaded elements positioned to apply a substantially constant force to move said wiper arm toward said windshield;

said microprocessor being programmed to dynamically vary the force applied by said actuator to optimize the force with which said wiper arm is pressed against said windshield.

2. The system of claim 1, wherein said wiper arm includes a bending joint to permit rotation of said blade within a plane which is parallel to the axis of said pivot shaft.

3. The system of claim 1, wherein said motor is a polyphase motor with electrical connections for only three phases of windings.

4. The system of claim 1, comprising at least three of said motors, each connected to drive a respective one of said wiper arms, and each connected to a respective actuator.

5. A windshield wiper system, comprising:

a wiper pivot shaft, a wiper arm affixed to said pivot shaft to be rotated thereby, a wiper blade affixed to said wiper arm to be rotated substantially in the plane of a vehicle windshield, and a polyphase brushless motor, having electrical connections to multiple windings, and being connected to drive said wiper pivot shaft;

a microprocessor electrically connected to receive commands and data from a master microprocessor over at least one system bus, and being electrically connected to sense the voltage across at least one winding of said motor, and having a plurality of output lines;

a plurality of transistors, each connected to be controlled by a respective output line of said microprocessor, and each connected to drive a respective one of said motor windings;

an additional mechanical actuator which is mechanically positioned to apply force to an element which moves in response thereto in a direction which is at least partly parallel to said pivot shaft; and at least one additional transistor connected to be controlled by a respective output line of said microprocessor, and connected to drive said actuator;

a mechanical connection from said element to said wiper arm said mechanical connection being physically separate from the location of said pivot shaft; and spring-loaded elements positioned to apply a substantially constant force to move said wiper arm toward said windshield;

said microprocessor being programmed to dynamically vary the force applied by said actuator to optimize the force with which said wiper arm is pressed against said windshield.

6. The system of claim 5, said microprocessor is a microcontroller.

7. The system of claim 5, said microprocessor provides logic-level outputs on said output lines, and said transistors are connected directly to receive said logic-level outputs without intervening buffer stages.

8. The system of claim 5, said transistors are MOS transistors.

9. The system of claim 5, wherein said motor is a variable-reluctance motor.

10. The system of claim 5, wherein said wiper arm includes a bending joint to permit rotation of said blade within a plane which is parallel to the axis of said pivot shaft.

11. The system of claim 5, said motor is a polyphase motor with electrical connections for only three phases of windings.

12. The system of claim 5, comprising at least three of said motors, each connected to drive a respective one of said wiper arms, and each connected to a respective actuator.

13. A windshield wiper system, comprising:

a wiper pivot shaft, a wiper arm affixed to said pivot shaft to be rotated thereby, a wiper blade affixed to said wiper arm to be rotated substantially in the plane of a vehicle windshield, and a polyphase brushless motor, having electrical connections to multiple windings, and being directly connected to drive said wiper pivot shaft;

a microprocessor electrically connected to receive commands and data from a master microprocessor over at least one system bus, and being electrically connected to sense the voltage across at least one winding of said motor, and having a plurality of output lines;

a plurality of transistors, each connected to be controlled by a respective output line of said microprocessor, and each connected to drive a respective one of said motor windings;

an additional mechanical actuator which is mechanically positioned to apply force to an element which moves in response thereto in a direction which is at least partly parallel to said pivot shaft; and at least one additional transistor connected to be controlled by a respective output line of said microprocessor, and connected to drive said actuator;

a mechanical connection from said element to said wiper arm, said mechanical connection being physically separate from the location of said pivot shaft; and spring-loaded elements positioned to apply a substantially constant force to move said wiper arm toward said windshield;

a windshield washer pump, comprising at least one winding, and physically connected to pump fluid in accordance with current pulses applied to said winding; and at least one additional transistor connected to be controlled by a respective output line of said microprocessor, and connected to drive said winding of said washer pump.

14. The system of claim 13, said microprocessor is a microcontroller.

15. The system of claim 13, said microprocessor provides logic-level outputs on said output lines, and said transistors are connected directly to receive said logic-level outputs without intervening buffer stages.

16. The system of claim 13, said transistors are MOS transistors.

17. The system of claim 13, wherein said motor is a variable-reluctance motor.

18. The system of claim 13, wherein said wiper arm includes a bending joint to permit rotation of said blade within a plane which is parallel to the axis of said pivot shaft.

19. The system of claim 13, said motor is a polyphase motor with electrical connections for only three phases of windings.

20. The system of claim 13, comprising at least three of said motors, each connected to drive a respective one of said wiper arms, and each connected to a respective actuator.

* * * * *

UNITED STATES PATENT AND TRADEMARK OFFICE
CERTIFICATE OF CORRECTION

PATENT NO.   : 5,504,406
DATED        : April 2, 1996
INVENTOR(S)  : Michael D. Shultz et al.

It is certified that error appears in the above-indentified patent and that said Letters Patent is hereby corrected as shown below:

On the title page; Item [75] Inventors, change

"Gil F. Schultz" to --Gil F. Shultz--.

Signed and Sealed this

Twenty-fourth Day of September, 1996

Attest:

BRUCE LEHMAN

*Attesting Officer*     *Commissioner of Patents and Trademarks*